Jan. 5, 1926.

E. C. SHAW

AIR BRAKE

Filed Dec. 19, 1923   2 Sheets-Sheet 1

1,568,189

Inventor:
Ernest C. Shaw
By Gillson & Mann
Attys.

Jan. 5, 1926.

E. C. SHAW

AIR BRAKE

Filed Dec. 19, 1923    2 Sheets-Sheet 2

1,568,189

Inventor:
Ernest C. Shaw
By Gillson Mann
Attys.

Patented Jan. 5, 1926.

1,568,189

UNITED STATES PATENT OFFICE.

ERNEST C. SHAW, OF CHICAGO, ILLINOIS.

AIR BRAKE.

Application filed December 19, 1923. Serial No. 681,492.

*To all whom it may concern:*

Be it known that I, ERNEST C. SHAW, a citizen of the United States, and resident of Chicago, county of Cook, and State of Illinois, have invented certain new useful Improvements in Air Brakes, of which the following is a specification, and which are illustrated in the accompanying drawings, forming a part thereof.

This invention relates to air brake systems and has for its principal object to make the brake application suited to the train whether it is initiated by manual operation on the part of the engine man or by automatic operation of train control devices.

Many schemes for the automatic control of trains have been proposed and of these a large number include means for venting the train pipe when the engine man fails to do his duty or when certain hidden dangers are encountered. This venting takes place at or near the engine and usually amounts to an emergency brake application, or at least to a heavy service application.

In the case of a long train, due to the peculiar laws governing the fluids through relatively long narrow passages, this rapid venting of the train pipe at or near the locomotive produces an immediately heavy application of the brakes at the front end of the train, while there is little or no application toward or at the rear end of the train. Consequently the locomotive and the leading cars are required to check the momentum of the entire train and this puts enormous compressive strains on the intermediate cars and frequently results in telescoping and other objectionable conditions that are familiar.

In the normal operation an engine man stops or checks a long train by first making a light application of, for example, eight pounds reduction, and after waiting for this reduction to travel along to the rear of the train, then making a second heavier application of, for example, fifteen or twenty pounds reduction in the train pipe. This operation is often termed making a "split application."

A heavy service or emergency brake application on a short train is also objectionable though not as hazardous as on a long train.

The usual practice is for the engine man to first make a light application and then follow it up with a series of light applications or a light continuing application. In other words, on short trains the engine man reduces the pressure in the train pipe slowly and more or less continuously until the required pressure on the brake shoes is developed.

An important object of the present invention is to make these adjustments and variations in the brake applications automatically and to automatically suit them to the length of the train whether it falls in the class usually termed "long trains" or that usually termed "short trains," or in the intermediate lengths, thus the initiation of a brake application will be inevitably and automatically followed by the desirable continued reduction in the train pipe pressure, or the subsequent rapid reduction of that pressure, or both, as the conditions may require.

According to the preferred embodiment of the invention, here illustrated, the initiation of a brake application has for its concomitant the opening of a slow vent connecting the train pipe with a supplemental reservoir or chamber, equipped with means for opening a vent in the train pipe when the pressure in such chamber or reservoir has reached a selected value.

When the train is short and, therefore, the volume of the train pipe is small, the equalization of the pressure in the train pipe and in the supplemental reservoir or chamber results in a material reduction of the pressure in the train pipe and the slow acting vent by which the equalization takes place has the same effect as a continuous venting of the equalizing tank by operation of the engine man's brake valve.

When the train is long the volume of the train pipe is correspondingly great and the loss of air in equalizing the pressure in the train pipe and in the supplemental reservoir or chamber is so small as to make an inappreciable reduction of the pressure in the train pipe and, therefore, has little or no effect in applying the brakes.

However, as soon as the pressure in the supplemental reservoir or chamber reaches a selected value the vent above mentioned is opened and produces a second, and if desirable, heavy service application of the brakes.

This, of course, rapidly reduces the pressure in the train pipe and causes a back leakage of air from the supplemental reservoir through the slow acting vent, which permits the large vent to close terminating the second brake application.

Preferably the closing of this vent is immediately followed by closing of the slow acting vent and the apparatus is then in condition to repeat the cycle of operations upon another initial brake application.

The invention will be fully understood by reading the description in connection with the accompanying drawing, in which Fig. 1 is a somewhat diagrammatic view illustrating the invention in connection with the Westinghouse E. T. airbrake equipment, and the automatic train control system of my copending application, Serial No. 628,284 filed March 28, 1923;

Figure 1:
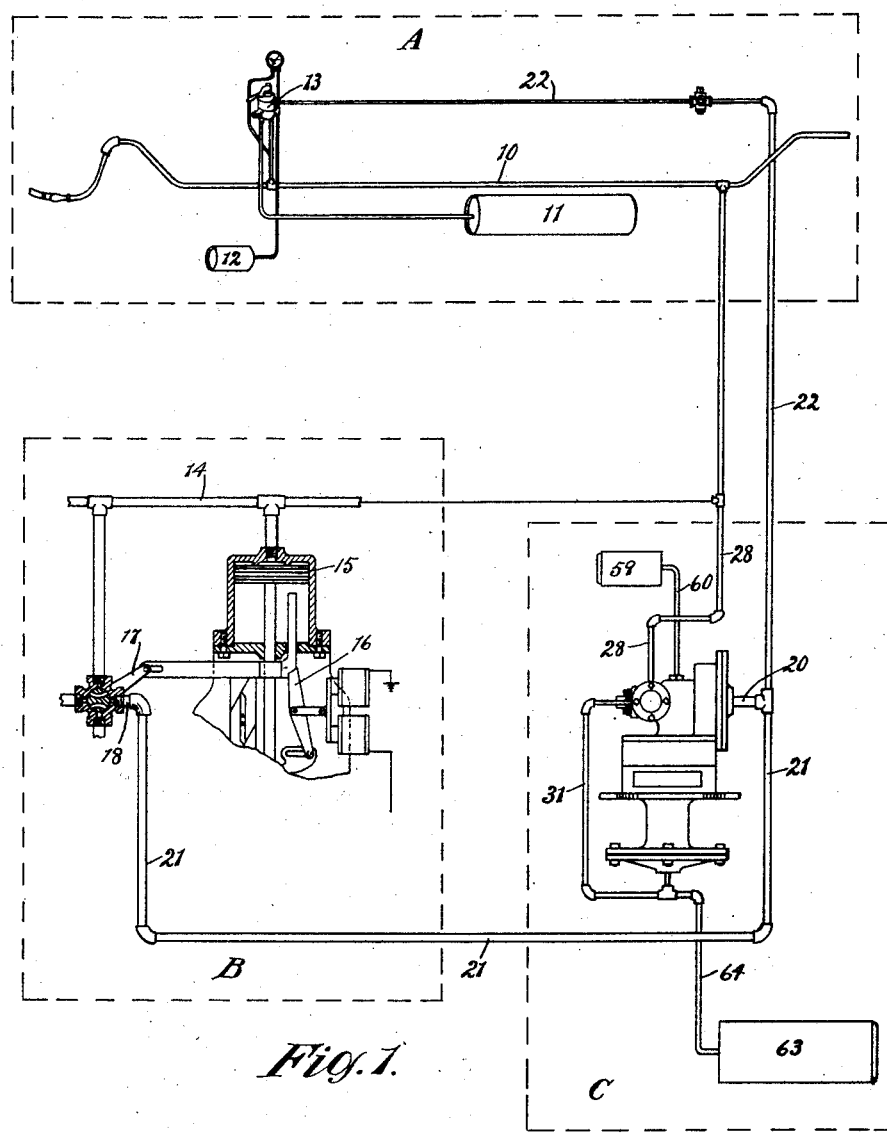

Within the rectangle A of Fig. 1 is shown diagrammatically a Westinghouse E. T. airbrake system including a train pipe 10, a main reservoir 11, an equalizing reservoir 12, and an engineer's brake valve 13. In the interest of simplicity the remaining parts of this well known system are omitted from the illustration.

Within the rectangle B of Fig. 1 is a diagrammatic illustration of a portion of the automatic train control system forming the subject matter of my above mentioned application, which includes a pipe 14 in communication with the train pipe, a piston 15 subjected to the pressure in the train pipe, a magnetically operated lock 16 for restraining the piston and a valve 17 operated by the piston to open the vent 18 communicating with the train pipe when the brakes are to be applied.

Within the rectangle C of Fig. 1 is a somewhat diagrammatic illustration of the added apparatus, which is illustrated in detail in the other views in the drawing. Preferably this apparatus is subjected to the pressure of the air set free in initiating a brake application, though of course this is not essential and the apparatus may be set in operation by various other means.

Figure 3:
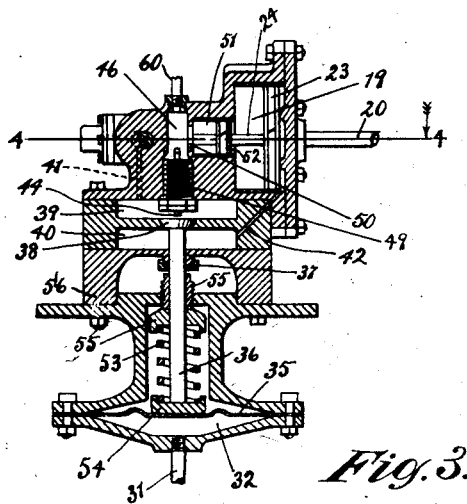
Fig. 3 is a sectional view taken on the line 3—3 of Fig. 4.
Figure 2:
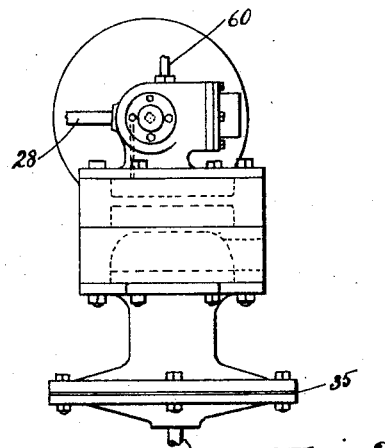
Fig. 2 is a side elevation of an attachment or accessory made according to the invention that may be connected with any air brake system to produce the results above described.
Figure 4:
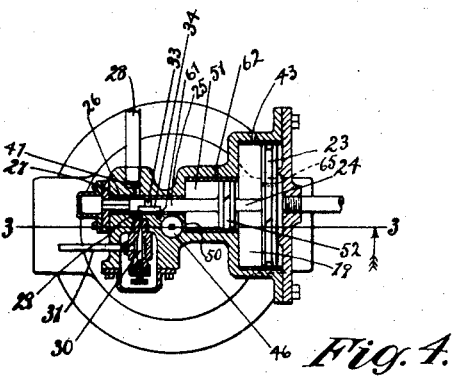
Fig. 4 is a sectional view taken on the line 4—4 of Fig. 3.

As shown, a cylinder 19, Figs. 3 and 4, communicates with a pipe 20 which, in turn, communicates with the source of this freed air. For convenience this pipe is shown in Fig. 1 connected with the pipe 21 which, in turn, is connected with the vent 18 opened by the operation of the automatic control system. The pipe is also connected with a pipe 22 which, in turn, is connected with the engineer's brake valve 13 either at the vent from the equalizing reservoir 12 or the vent from the train pipe, as is most convenient.

Air entering the cylinder 19 acts against a piston 23 therein having a piston rod 24 connected with a slide valve 25 which controls the slow acting vent above referred to. This valve comprises a cylindrical rod mounted to oscillate in a complemental bore 26, which may be bushed as indicated at 27, or otherwise as desired. The bore 26 is connected by a pipe 28 with the train pipe. It is also connected by a port 29 with a needle valve 30 which controls the entrance to a pipe 31 leading to a supplemental reservoir or chamber 32, above referred to. The valve 25 has a circular passage 33 and at one side a longitudinal passage 34. When the piston 23 moves to the left in Figs. 3 and 4 these passages effect a communication between the pipe 28 and the needle valve 30 or between the train pipe 10 and the supplemental reservoir or chamber 32.

The supplemental reservoir or chamber is equipped with pressure sensitive devices of some kind, here illustrated by the diaphragm 35, which acts against a push rod 36 passing through a stuffing box 37 and carrying a valve 38 which controls communication between the chambers 39 and 40. The chamber 39 is in communication with the pipe 28 through a passage 41 and is, therefore, subjected to the train pipe pressure. The chamber 40 communicates through the passage 42 with the cylinder 19 which communicates with the atmosphere through a port 43. Thus, when the pressure in the supplemental reservoir or chamber 32 opens the valve 38 the train pipe is vented through the pipe 28, passage 41, chambers 39 and 40, passage 42, cylinder 19 and port 43.

Figure 6:
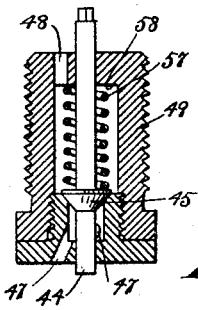
Figs. 6 and 7 are longitudinal section and plan views respectively of a valve forming a part of this apparatus.
Figure 5:
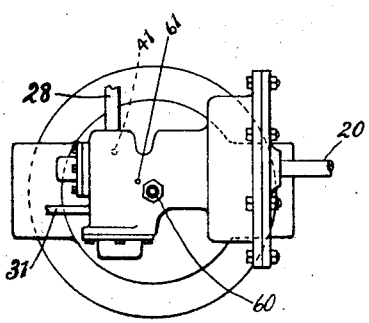
Fig. 5 is a plan view of the device shown in Fig. 2.
Figure 7:
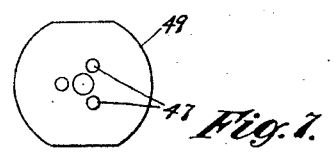

The valve 38 comes in contact with the push rod 44 of a valve 45, illustrated in detail in Figs. 6 and 7, which controls communication between the chamber 39 and the chamber 46 (Figs. 3 and 4) through the passages 47 and 48, in the casing 49 of the valve 45.

The chamber 46 is in open communication through the passage 50 with a cylinder 51 equipped with a piston 52 secured to the piston rod 24.

Opening the valve 38, therefore, puts chamber 46 and cylinder 51 in communication with the train pipe and stores in them sufficient pressure to move the piston 52 and, therefore, the piston 23 to the positions shown in Figs. 3 and 4 as soon as the pressure in the cylinder 19 drops below that of the train pipe, due to the closing of the valve 38.

The valve 38 is normally held seated by a spring 53 operating between the head 54 on the valve stem 36 and an adjustable collar 55 threaded in the casing 56. When the pressure in the train pipe, due to the opening of the valve 38, drops below a selected value the air in the supplemental reservoir or chamber 32 leaks back through the pipe 31, through the needle valve 30, through the pipe 28 back to the train pipe, and as soon as the pressure in the chamber 32 drops below the selected value, the spring 53 closes the valve 38.

The valve 45 (Figs. 6 and 7) is also normally held seated by a spring 57, which acts between a shoulder 58 in the casing 49 and the valve head 45. The push rod 44 is preferably spaced from the valve 38 and, therefore, the valve 45 is not opened until after pressure of the train pipe is communicated to the cylinder 19 in front of the piston 23, and it is closed before pressure in the train pipe is cut off by the valve 38 which latter results in trapping sufficient air in the chamber 46 and the cylinder 51 to move the piston 52 to the right after the valve 38 closes. To insure this latter result the chamber 46 may be equipped with an auxiliary tank 59 (Fig. 1) connected therewith by a pipe 60.

When the piston 23 returns to the position shown in Figs. 3 and 4, the longitudinal passage 34 of the slide valve 25 (Fig. 4) connects the port 29 and, therefore, the chamber 32 with an exhaust port 61 leading to the atmosphere whereby the residual air in said chamber is permitted to escape.

The cylinder 51 is provided with an exhaust port 62 (Fig. 4) that is uncovered when the piston assumes its normal position, shown in Figs. 3 and 4, and permits the air in the cylinder 51, the chamber 46 and the supplemental tank 59 to escape.

The supplemental reservoir or chamber 32 is preferably given capacity by the addition of a supplemental tank 63 connected therewith by a pipe 64.

*Operation with a long train.*

Upon operation of the engine man's brake valve or the automatic train control system, air pressure is communicated to the cylinder 19, and the piston 23 is shifted to the left in Figs. 3 and 4, taking the slide valve 25 with it. This puts the supplemental reservoir or chamber 32 in communication with the train pipe through the pipe 28, the passages 33 and 34, the port 29, the needle valve 30 and the pipe 31. In due course depending upon the setting of the needle valve and other proportions, pressure in such supplemental reservoir or chamber becomes sufficient to overcome the spring 53 and open the valve 38, which connects the train pipe with the atmosphere through the pipe 28, passage 41, chambers 39 and 40, passage 42, cylinder 19 and port 43. When pressure in the train pipe drops below the pressure in the chamber 32 air leaks back through the needle valve 30 relieving the spring 53 and permitting the valve 38 to close. In its opening movement the valve 38 has, through the push rod 44, opened the valve 45, and put the chamber 39 in communication with the chamber 46, its auxiliary tank 59, and the cylinder 51. In its downward movement the valve 38 has permitted the valve 45 to close and trap pressure behind the piston 52, which moves to the right as soon as the pressure in the cylinder 19 becomes sufficiently low.

Piston 23 is equipped with a small port 65 which permits the escape of air in front of the piston after the port 43 has been closed. This port, however, is so small that in the initial operation of the device the leakage through it becomes immaterial.

It will be noted that the piston 52 is of less area than the piston 23 which permits the exhausting air escaping through the port 42 into the cylinder to hold the pistons in their left position, notwithstanding the pressure of the train pipe in the cylinder 51 until the venting through the valve 38 is complete.

*Operation with short train.*

With a short train the train pipe is put in communication with the auxiliary reservoir or chamber through the needle valve in the same way as before, but the relation between the volumetric capacity of the train pipe and of the supplemental reservoir or chamber is greatly different, and equalizing the pressure in them results in a reduction of the train pipe pressure which, in turn, results in further application of the brakes. The greater the volumetric capacity of this reservoir or chamber with respect to the train pipe the more the venting of the train pipe through the needle valve will affect the brakes and the more it will take on the character of the continuous brake application. The less the volumetric capacity of this reservoir or chamber with respect to the train pipe, the less will the venting through the needle valve affect the pressure in the train pipe and, therefore, affect the application of the brakes. With certain relative capacities the venting of the train pipe through the needle valve will not result in opening the valve 38 and the brake application will consist of the initial train pipe reduction followed by a continuous slow reduction. With a high volumetric capacity in the train pipe that would be obtained in a long train the venting through the needle valve will affect the pressure in the train pipe very little, but will create sufficient pressure in the supplemental reservoir or chamber to open the valve 38 and effect a second distinct brake application. Between these two conditions there are as many variations as there are lengths of train and, therefore, the device automatically adjusts itself to the length of the train and makes the brake application suited thereto regardless of the initiating cause or the indifference or inaction of those in control. The effects produced may be varied by varying the capacity of the supplemental reservoir or chamber which becomes a matter of selection of the tank 63. After the selection of proportions has been made the length of the train becomes the controlling factor in the selection of the brake application, and an initial brake application from any cause is followed by such subsequent applications as is suited to that length of train.

I have made use of the air set free in the initial brake application to set the mechanism in operation because it is a convenient and economical source of power, but it will be understood that the device may be set in operation by any other suitable means and I do not wish to be limited in this or any other respect except as is made necessary by the prior art.

I claim as my invention:

1. In an air brake system including a train pipe, means controlled thereby for applying the brakes and means for venting the system to cause a brake application, in combination with means set in operation at such venting to produce a later venting of the system independent of the duration of the first venting.

2. In an air brake system including a train pipe, means controlled thereby for applying the brakes and means for venting the system to cause a brake application, in combination with means put in communication with the system at the venting and acting independently thereafter to produce a subsequent venting.

3. In an air brake system including a train pipe, means controlled thereby for applying the brakes and means for venting the system to cause a brake application, in combination with a slow acting vent put in communication with the system at such venting and continuing thereafter independently of the first venting, and means operated by leakage through said slow acting vent for substantially producing a brake application.

4. In an air brake system including a train pipe, means controlled thereby for applying the brakes and means for venting the system to cause a brake application, in combination with a slow acting vent put in communication with the system at such venting, a supplemental air chamber communicating with the system through said vent and means operated by pressure in said chamber for venting the system independently of the duration of the first venting.

5. In an air brake system including a train pipe, means controlled thereby for applying the brakes and means for venting the system to cause a brake application, in combination with a slow acting vent put in communication with the train pipe at such venting, a supplemental air chamber communicating with the train pipe through said vent, means operated by pressure in said chamber for venting the system, and means operated at the last venting for closing the slow acting vent.

6. In an air brake system including a train pipe, means controlled thereby for applying the brakes and means for venting the system to cause a brake application, in combination with a slow acting vent put in communication with the train pipe at such venting, a supplemental air chamber communicating with the train pipe through said vent, means operated by pressure in said chamber for venting the system, and means operated by the last means for closing the slow acting vent.

7. In an air brake system including a train pipe, means controlled by the train pipe for operating the brakes and means for venting the system to make a brake application, in combination with a valve opened at such venting to continue venting the system independently of the duration of the first venting.

8. In an air brake system including a train pipe, means controlled by the train pipe for operating the brakes, means for venting the system to make a brake application, in combination with a valve opened at such venting to continue venting the system independently of the first venting, and means operated by the continued venting to effect another brake application.

9. In an air brake system including a train pipe, means controlled by the train pipe for operating the brakes, means for venting the system to make a brake application, in combination with a slow acting vent opened in the making of a brake application and remaining open after the first venting has ended, and means operated by the continued slow venting for making another brake application.

10. In an air brake system including a train pipe, means controlled by the train pipe for operating the brakes, means for venting the system to make a brake application, in combination with a slow acting vent opened in the making of a brake application and remaining open after the first venting has ended, and a valve opened by the slow venting for making another brake application.

11. In an air brake system including a train pipe, means controlled by the train pipe for operating the brakes, means for venting the system to make a brake application, in combination with a slow acting vent opened in the making of a brake application and remaining open after the first venting has ended, a valve opened by the slow venting for making another brake application, and means for closing the valve when the pressure in the train pipe is reduced below a selected amount.

12. In an air brake system, means for reducing the pressure in a train pipe to make a brake application, and means cooperating with the first means to make a subsequent independent brake application.

13. In an air brake system, means for reducing the pressure in a train pipe to make a brake application, and means set in operation at such venting for automatically producing in short trains a continuous slow venting of the train pipe and in long trains a delayed secondary venting of the train pipe.

14. In an air brake system including a train pipe and means for venting the system to make a brake application, the combination of a supplemental chamber and means operated at such venting to put the train pipe in communication with the supplemental chamber and continuing such communication independently of the venting.

15. In an air brake system including a train pipe and means for venting the system to make a brake application, the combination of a supplemental chamber, means operated at such venting to put the train pipe in communication with the supplemental chamber, and pressure sensitive means cooperating with the supplemental chamber for venting the system subsequent to the first venting.

16. In an air brake system including a train pipe and means for venting the system to make a brake application in combination with a supplemental reservoir, a restricted passage connecting the train pipe with the supplemental reservoir and means for controlling that passage independently of the means for venting the system to make a brake application.

17. In an air brake system including a train pipe and means for venting the system to make a brake application, the combination of a supplemental reservoir, a restricted passage connecting the train pipe with the reservoir, a valve operated at such venting for opening said passage.

18. In an air brake system including a train pipe and means for venting the system to make a brake application, the combination of a supplemental reservoir, a restricted passage connecting the train pipe with the reservoir, a valve operated by the escaping air for opening said passage.

19. An article of manufacture including a chamber, a passage communicating with said chamber and adapted to be connected with an air brake system, a valve for controlling said passage, pressure sensitive means for cooperating with said chamber, and means operated by the pressure sensitive means for making a brake application.

20. In an article of manufacture including a chamber, a restricted passage controlling communication with the chamber and adapted to be connected with the train pipe of an air brake system, a pressure sensitive device cooperating with said chamber, a second chamber adapted to be connected with the train pipe, means operated by the pressure sensitive device for venting the second chamber, and a valve for controlling the restricted passage.

21. In an article of manufacture including a chamber, a restricted passage controlling communication with the chamber and adapted to be connected with the train pipe of an air brake system, a pressure sensitive device cooperating with said chamber, a second chamber adapted to be connected with the train pipe, means operated by the pressure sensitive device for venting the second chamber, a valve for controlling the restricted passage, and pressure sensitive means for operating the last mentioned valve.

22. An article of manufacture including a chamber, a passage forming the sole communication with said chamber and adapted to be connected with an air brake system, pressure sensitive means for cooperating with said chamber and means operated by the pressure sensitive means for making a brake application.

23. In an air brake system including a train pipe, means controlled thereby for applying the brakes and means for venting the system to cause a brake application, in combination with means set in operation at such venting to produce a later venting of the system after the first venting has ended.

24. In an air brake system including a train pipe, means controlled thereby for applying the brakes and means for venting the system to cause a brake application, in combination with means set in operation at such venting and acting independently thereafter to produce a later venting of the system.

25. In an air brake system including a train pipe, means controlled thereby for applying the brakes and means for making a brake application by venting the system, in combination with means set in operation at the making of a brake application to make a second distinct brake application.

26. In an air brake system including a train pipe, means controlled thereby for applying the brakes and means for making a brake application by venting the system, in combination with means set in operation at the making of a brake application to make the brake application continuing in a short train and to make a second distinct brake application in a long train.

ERNEST C. SHAW.